H. T. REEVE.
EYE PROTECTOR.
APPLICATION FILED OCT. 12, 1917.
1,304,805.
Patented May 27, 1919.
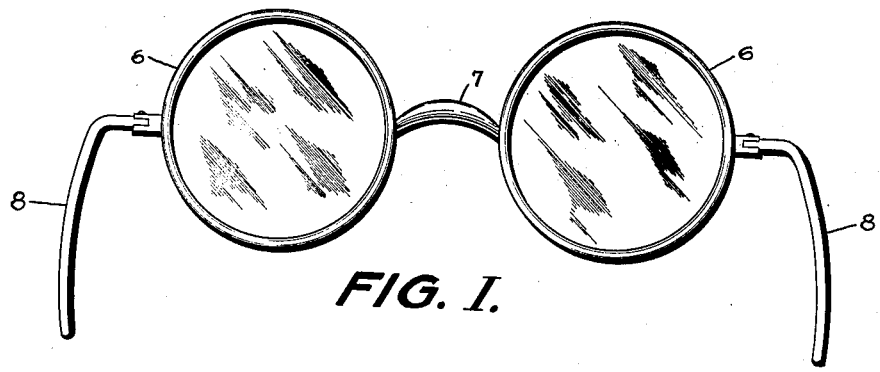
FIG. I.
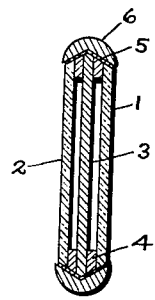
FIG. II.
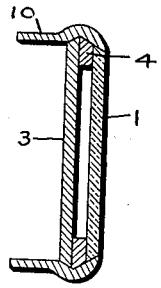
FIG. III.
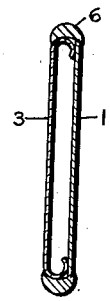
FIG. IV.
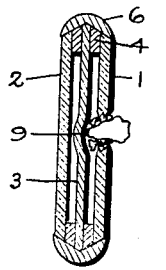
FIG. V.
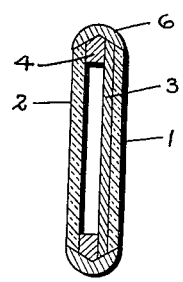
FIG. VI.
INVENTOR
HOWARD T. REEVE
BY
H. H. Styll  T. H. K. Parsons
ATTORNEY

UNITED STATES PATENT OFFICE.

HOWARD T. REEVE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,304,805.     Specification of Letters Patent.     Patented May 27, 1919.

Application filed October 12, 1917. Serial No. 196,118.

*To all whom it may concern:*

Be it known that I, HOWARD T. REEVE, a subject of the King of England, residing at Southbridge, in the county of Worcester and State of Massachusetts, have invented certain new and useful Improvements in Eye-Protectors, of which the following is a specification.

This invention relates to improvements in eye protectors and has particular reference to a structure of this character which shall be clear and transparent to vision, which cannot be readily scratched or its visual efficiency impaired, and which will give the wearer maximum protection from flying particles or small objects.

A further object of the invention is the provision of an improved lens for an eye protector which shall embody both scratch, dirt and abrasive resisting properties of glass and the toughness of celluloid or other similar non-frangible materials, and which will thus secure to the wearer maximum protection and visual desirablity, and will at the same time eliminate the possibility of flying chips or the like from the glass surface coming into contact with and injuring the eye of the wearer.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of an eye protector embodying my improvements.

Fig. II represents a vertical sectional view illustrating one form of lens for use in connection therewith.

Fig. III represents a similar view of another construction of lens.

Fig. IV represents a similar view of another simplified form of my invention.

Fig. V represents a sectional view illustrating the effects of an impact against my improved lens.

Fig. VI represents a sectional view of a slightly modified form thereof.

I am aware that prior to my invention use has been made in the art of a compound lens comprising layers of glass and celluloid or similar material secured together in a homogeneous or unitary structure, but I have found by experimentation with structures of this character that when a severe blow such as these lenses are liable to receive in the industries, is given to one side of the lens, that while the lens will not break and allow the object to pierce it the uniting of the parts into a unitary structure will cause the vibration of the blow to be transmitted to the opposite face of the lens and there forcibly throw off particles of the glass at the rear, involving liability of injury to the eye of the wearer from the glass of the proposed protection lens from this vibration effect.

It is, therefore, one of the principal objects of my present invention to provide an improved lens which shall have the advantage of resisting penetration to a maximum amount and to as great or greater amount than the structures hitherto known in the art, which shall preferably in addition possess the advantage of a glazed surface or surfaces of sufficient strength to take up slight or ordinary shocks and to resist to a maximum interferences with the vision through scratches or other abrasions through destroying of the surface by cleaning or injury as when laid down on a bench or other exposed position.

In the accomplishment of these objects I may for example employ the improved construction of lens illustrated in section in Fig. II of the drawings as a single unitary device adapted to be mounted in an ordinary lens frame. This single unitary lens as here illustrated comprises the front glazed portion 1, the rear glazed portion 2 and the intermediate transparent non-vitreous member 3, these several members being held in spaced relation as by the resilient or yielding annuli or rings 4 and the entire lens being held together as by the cementitious or other binding rim 5, and being formed with a rounded or beveled edge so it may be readily mounted within the ordinary rim 6, a pair of rims 6 being shown in Fig. I as connected by a bridge 7 and adapted to be held in place on the face of the wearer by the temples 8.

It will thus be seen that the improved lens shown in Fig. II has on its inner and outer faces the glass portions 1 and 2, as in an ordinary lens, presenting the usual glazed surfaces which may be readily wiped or cleaned and will resist scratching or the like, tending to interfere with the vision of the wearer to a maximum. At the same time there is disposed between these surfaces the celluloid or similar non-vitreous but transparent, tough and not readily breakable material, tending to resist penetration. In the event that a flying particle strikes a lens made up as aforesaid the lens 1 will take up the initial shock yielding somewhat against the resilient ring 4 so it will remain unshattered by a slight blow. Under a heavier blow a certain amount of the force of the blow will be absorbed by the yielding movement but an additional amount will be absorbed by the shattering of the member 1. After shattering of this member, however, the particle shattering the member 1 will come in contact with the transparent non-vitreous member 3, the strength of this member being made sufficient to resist any force expected to be met with in connection with the use of the goggles and compatible with the resistance qualities of the frame as a whole.

The effect of the blow may be even sufficient to produce the result indicated in connection with Fig. V in which the member 1 is shown as shattered and the member 3 as forced rearwardly at the point 9 from the force of the blow. It will be noted, however, that the force of the blow is taken up both by the toughness of the material 3 itself and also by the resiliency of the second ring 4 disposed therebehind so that while the material 3 is so distorted as to render it practically useless for further visual purposes the rear lens 2 has not been touched or cracked, so that no injury could possibly have occurred to the eye of the wearer.

Moreover, it is a well known fact that the eye will involuntarily twitch the lid shut upon threat of a blow against the eye and with my improved construction the retardation caused by the members 1 and 3 is sufficient to allow the eye to automatically shut even should the force of the particle striking my improved lens be sufficient to force its way through or so penetrate the member 3 as to break the rear lens 2 so that any possible flying particles from the rear lens 2 would be embedded in the lid of the eye and would not strike the eye ball, thus preventing possible injury to the sight of the wearer.

In Fig. III, I have illustrated a simpler form of my invention, in which I have employed merely the front lens 1, the buffer member 4 and the intermediate non-vitreous member 3, the frame 6 in this instance being shown as having the rearwardly extending eye cup portion 10 which would serve to protect the member 3 from ordinary injuries so that the glass cover member is rendered less necessary.

In Fig. IV, I have illustrated a similar construction, in which the member 4 has been eliminated and the desired space is obtained by forming forward curving peripheral flange 11 on the member 3, which thus forms its own resilient spacing member, the advantages here attained being the same as previously described.

I claim:

1. A lens of the character described, including an outer vitreous portion, an intermediate resilient spacing member, and a rear non-vitreous shock resisting member disposed rearwardly of the spacing member.

2. A lens for the purpose described, including a front glass, a tough transparent backing member therefor, a rear glass, and an annular member interposed between the backing member and the rear member, substantially as and for the purpose described.

3. A lens for an eye protector, including vitreous outer members, a non-vitreous central member and means for holding the several members in spaced relation one to the other.

4. A lens for an eye protector, including spaced frangible and non-frangible transparent disks, and means securing the disks together in spaced relation to form a unitary structure.

5. A lens for an eye protector, including a frangible outer member and a spaced infrangible backing therefor.

In testimony whereof I have affixed my signature, in presence of two witnesses.

HOWARD T. REEVE.

Witnesses:
 EDITH M. HALVORSEN,
 ESTHER M. LAFLER.